Aug. 15, 1961  H. RICH ET AL  2,996,672
LONG-SCALE INSTRUMENT
Filed May 1, 1959

INVENTORS
HAROLD RICH
RALPH M. ROWELL
BY
Irving M. Freedman
THEIR ATTORNEY

United States Patent Office

2,996,672
LONG-SCALE INSTRUMENT
Harold Rich and Ralph M. Rowell, Lynn, Mass., assignors to General Electric Company, a corporation of New York
Filed May 1, 1959, Ser. No. 810,472
3 Claims. (Cl. 324—150)

This invention relates to a long-scale instrument and, in particular, to a magnetic shunt arrangement for obtaining desired scale distribution characteristics.

It is common practice in the manufacture of long-scale instruments of the permanent-magnet moving-coil type to utilize conventional manufacturing tolerances with a standard scale having the desired distribution characteristics incorporated therein and to calibrate or adjust the instrument after assembly to cause the scale deflection characteristics to correspond to the scale. Such a procedure is more desirable than individually calibrating the scale of each instrument to correspond to the deflection characteristics thereof. It is also desirable to be able to obtain a uniform scale distribution in a long-scale instrument by compensating for the inherent design factors which tend to produce a non-linear scale.

An object of this invention is to provide an improved long-scale instrument having a scale distribution adjustment which can be utilized to provide a linear scale distribution characteristic after the assembly of an instrument constructed with conventional manufacturing tolerances.

Another object of the invention is to provide an improved arrangement for adjusting the scale distribution characteristics of a long-scale instrument without interfering with the introduction or removal of the moving coil assembly after the instrument is assembled.

Still another object of this invention is to provide an improved scale distribution adjustment in a long-scale instrument which is uncomplex in structure and which may be readily adjusted.

Further objects and advantages of the invention will become apparent as the following description proceeds and the features of novelty which characterize the invention will be pointed out with particularity in the claims annexed to and forming a part of this specification.

In accordance with one form of the invention a magnetic shunt is provided in a long-scale instrument of the moving-coil type in which the coil rotates in the air gap formed between an open-ended hook type of core and an arcuate pole piece. In such an arrangement the hook forms an opening or slot between the end region and the shank portion thereof to facilitate the introduction and removal of the moving-coil assembly. The hook includes a central opening proportioned to provide the hook with a cross-section which gradually tapers from a large value adjacent to the shank to a smaller value remote from the shank. Such an arrangement provides unequal flux paths and a non-linear flux distribution characteristic with a resultant non-linear coil deflection characteristic.

The magnetic shunt comprises a movably mounted flat magnetic member positioned in the region between the shank of the core and the pole piece remote from the opening of the core. The magnetic shunt is adjusted to divert magnetic flux from the air gap at the side of the shank at which it is positioned. The shunting action provides more uniform flux distribution throughout the length of the air gap without interfering with the removal or insertion of the coil assembly through the core opening.

For a better understanding of this invention, reference may be had to the following description taken in connection with the accompanying drawings in which.

Figure 1:
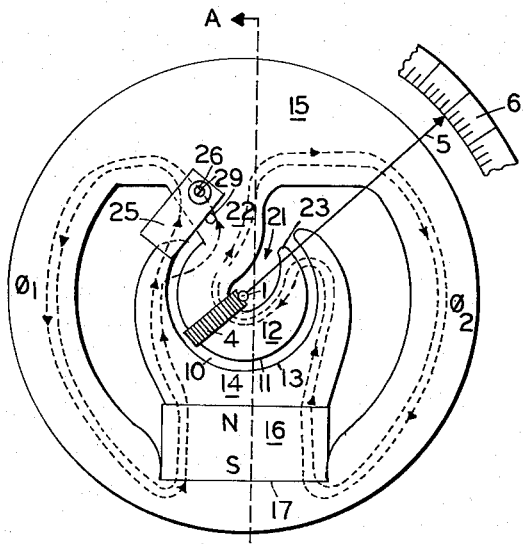
FIG. 1 is a top view of the magnetic structure of a long-scale instrument embodying the invention with the case and lead connections omitted for purposes of clarity.
Figure 2:
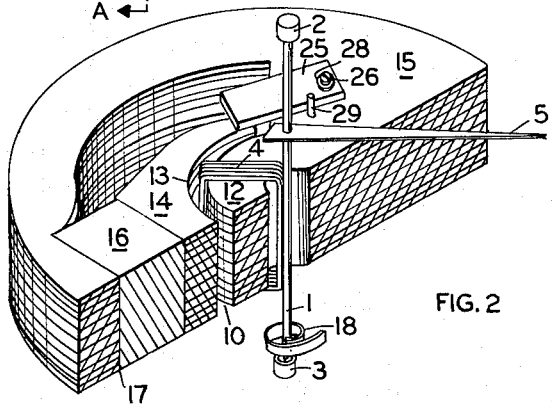
FIG. 2 is an isometric sectional view taken along line A—A of FIG. 1 in the direction of the arrows.

Referring to FIGS. 1 and 2, a long-scale 250° instrument is shown in which a shaft 1 is rotatably mounted through cooperation with bearings 2 and 3 at the ends thereof. Rigidly affixed to shaft 1 for rotation therewith is coil 4 of a substantially rectangular shape which extends radially from one side of the shaft. A pointer 5 is also rigidly affixed to shaft 1 and cooperates with a suitable scale 6 to indicate the magnitude of the rotation of coil 4.

One side of coil 4 is arranged to deflect within the annular air gap 10 formed between the circular outer surface 11 of core member 12 and the surrounding concentric circular surface or pole face 13 of pole member 14 which is spaced from the core member. The core member 12 is a depending portion of ring member 15 which completely encircles the core to provide a flux return path and magnetic shielding for the instrument. The ring member 15 and the C-shaped pole 14 are preferably fabricated from a series of magnetic laminations which are cemented and baked under pressure after assembly in a manner well known in the art.

Magnetomotive force is provided by permanent magnet 16 interposed between the pole member 14 and the interior surface 17 of ring member 15 diametrically opposite the core member 12. The permanent magnet 16 is preferably of the Alnico type and is polarized as indicated in FIG. 1 to provide a fixed magnetic field in the air gap 10. The magnetic members 14, 15 and 16 may be fastened together by silver solder, by welding, or by riveting the members between side plates (not shown).

The control spring 18 associated with shaft 1 positions the shaft so that the pointer 5 indicates zero in the absence of current flow through coil 4. Current flow through coil 4 produces a magnetic field which interacts with the fixed magnetic field existing in the air gap 10 due to the permanent magnet 16 to produce a deflection of coil 4 proportional to the magnitude of the current.

In order to facilitate the introduction and removal of the coil assembly, the core 12 is formed in the shape of a hook having an axial opening 21 concentrically located with respect to the outer cylindrical surface of the core. The opening 21 is so positioned that the hook-shaped core 12 tapers from a cross-section having a large value adjacent the shank portion 22 to a smaller value at the tip 23 remote from the shank portion. Insertion and removal of the coil assembly which includes the coil 4 along with the shaft 1 and associated members, such as control spring 18, is accomplished by rotating the coil until the coil side in the air gap 10 lies in the axial opening 21. The coil may then be removed in an axial direction.

The magnetic flux distribution of air gap 10 is determined by the paths taken by the flux which emerges from the permanent magnet 16 and, as indicated by the arrows associated with the dotted lines of FIG. 1, the major portion of the flux passes successively through pole member 14, air gap 10, the hook section of core member 12, and the shank section of core member 12. The flux then divides into two branches, indicated as $\phi_1$ and $\phi_2$ in FIG. 1, and passes through ring member 15 to re-enter the magnet 16 at surface 17. It should be noted that substantially all of the flux tends to pass through shank 22, and that the path taken by the flux $\phi_2$ is longer than that taken by $\phi_1$. The flux $\phi_2$ passes through tip 23 of core 12 from the upper region of pole member 14 and then through the hook portion of core 12 to shank portion 22, whereas $\phi_1$ passes directly from the upper region of the pole member 14 to the shank 22. The flux $\phi_2$ takes the longer path rather than passing across the air gap formed by opening 21 because the magnetic reluctance of the path through opening 21 is considerably larger than the longer path which includes a shorter air gap 10. The net result is that a larger portion of the flux from magnet 16 tends to take the shorter magnetic path illustrated generally as $\phi_1$ rather than the longer path $\phi_2$, producing an uneven flux distribution in the air gap 10 which is less concentrated in the region of tip 23 than in the regions at the opposite end of the air gap.

In order to provide a uniform flux distribution throughout the air gap, and in particular at the ends thereof, an adjustable magnetic shunt is provided to divert a portion of the flux $\phi_1$ from the air gap 10 in the region of the shunt. The adjustable magnetic shunt includes a flat magnetic member 25 of cold rolled steel secured at one end to the shank portion 22 of core 12 by a fillister-head screw 26 which passes through an opening 27 in the magnetic shunt member to engage threads tapped in the shank of the core. A lock washer 28 interposed between the head of screw 26 and magnetic shunt member 25 facilitates the clamping of the shunt in the desired position after adjustment thereof.

In the shunting arrangement shown in FIGS. 1 and 2, the magnetic shunt member 25 is pivotally mounted by screw 26 for movement toward or away from air gap 10. The shunting effect increases as member 25 is moved toward the air gap 10. However, the shunt member 25 should not extend far enough into the air gap to interfere with the rotation of coil 4, and stop member or pin 29 may be secured to shank 22 as shown or to pole member 14 to limit the movement of shunt and prevent interference with the coil rotation.

Figure 3:
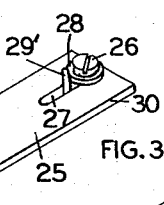
FIGS. 3 and 4 illustrate alternate embodiments of the magnetic shunt construction shown in FIGS. 1 and 2.
Figure 4:
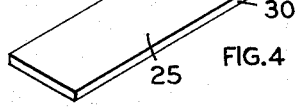

Variations of the mounting arrangements for magnetic shunt 25 are shown in FIGS. 3 and 4. Referring to FIG. 3, it will be noted that the opening 27' is provided in the form of a longitudinal slot and pin member 29' affixed to shank 22 is positioned within the slot to assure rectilinear motion of the magnetic shunt member 25 and preclude movement of the magnetic member into the air gap 10 an amount which would interfere with coil 4. The combination of screw 26 and pin 29' cooperating with slot 27' in FIG. 3 assures that edge 30 closest to the air gap 10 moves only in a direction substantially tangentially to the pole face or surface 13.

Rather than guiding member 25 in a direction tangential to pole face 13, the shunt can be guided in a radial direction outward from pole face 13 and away from the air gap 10. Such an arrangement is illustrated in FIG. 4. Referring to FIG. 4, it is noted that the opening or slot 27'' extends generally in a radial direction relative to pole face 13 so that pin member 29'' guides member 25 in a radial direction. Slot 27'' of member 25 may be dimensioned relative to pin member 29'' and screw 26 so that a positive stop is provided to insure that the pin member 25 does not extend too far into air gap 10. As shown in FIG. 4, the pin member 29'' limits the movement of member 25 toward the right or toward the air gap but does not preclude movement in the opposite direction.

It is therefore apparent that magnetic shunt 25 diverts a portion of the magnetic flux $\phi_1$ from the air gap 10 in the region of shank 22 to provide uniform flux distribution in the air gap 10 throughout the portion traversed by coil 4. Under such conditions, a linear scale may be accomplished in an uncomplex manner without interfering with the introduction or removal of the coil assembly from the core 12.

Therefore, while particular embodiments of the subject invention have been shown and described herein, they are in the nature of description rather than limitation, and it will occur to those skilled in the art that various changes, modifications, and combinations may be made within the province of the appended claims without departing either in spirit or scope from the invention in its broader aspects.

What we claim as new and desire to secure by Letters Patent of the United States is:

1. A scale distribution adjustment for use in an electrical instrument of the long-scale type having a rotatably mounted coil adapted to move in a magnetic field in accordance with current flow through the coil, including a magnetic structure comprising a hook-shaped core forming an opening between the tip and the shank portion thereof, a pole piece having an arcuate magnetic pole face surrounding and spaced from a portion of said core and forming an air gap therebetween, a magnetic flux producing member for directing magnetic flux through the magnetic circuit including said pole piece, said air gap, and said core, said coil extending from the central region of and around said hook-shaped core and through said air gap, said coil being rotatably mounted about an axis through said central region, portions of said magnetic flux passing directly between said pole piece and the shank of said hook-shaped core across the air gap while other portions of the flux after crossing the air gap pass between the pole piece and shank through the intermediary of said tip of the core thereby providing unequal length flux paths and resultant unequal flux distribution along said air gap, and an adjustably mounted magnetic shunt member extending between said pole piece and shank in the region remote from said opening, said shunt member being positioned to shunt a portion of the flux from said air gap in said shank region without substantially affecting the flux distribution over the remainder of said air gap and thereby enable control of the scale distribution to provide a substantially linear scale distribution.

2. A scale distribution adjustment for use in an electrical instrument of the long-scale type having a rotatably mounted coil adapted to move in a magnetic field in accordance with current flow through the coil, including a magnetic structure comprising a hook-shaped core forming an opening between the tip and the shank portion thereof, an arcuate magnetic member surrounding and spaced from a portion of said core and forming an air gap therebetween, a magnetic flux producing member for directing magnetic flux through the magnetic circuit including said arcuate magnetic member, air gap, and core, said coil extending from the central region of and around said hook-shaped core and through said air gap, said coil being rotatably mounted about an axis through said central region, portions of said magnetic flux passing directly between said arcuate member and the shank of said hook-shaped core across the air gap while other portions of the flux after crossing the air gap pass between the arcuate member and shank through the intermediary of said tip of the core thereby providing unequal length flux paths and resultant unequal flux distribution along said air gap, an adjustably mounted magnetic shunt member extending between and overlying said arcuate magnetic member and shank in the region remote from said opening, said shunt member being positioned to shunt a portion of the flux from said air gap in said shank region, and a guide member cooperating with said magnetic shunt member to preclude movement thereof into the region of said air gap which would interfere with the rotation of said coil.

3. A scale distribution adjustment for use in an electrical instrument of the long-scale type having a rotatably mounted coil adapted to move in a magnetic field in accordance with current flow through the coil, including a magnetic structure comprising a hook-shaped core forming an opening between the tip and the shank portion thereof, an arcuate magnetic member surrounding and spaced from a portion of said core and forming an air gap therebetween, a magnetic flux producing member for directing magnetic flux through the magnetic circuit including said arcuate magnetic member, air gap, and core, said coil extending from the central region of and around said hook-shaped core and through said air gap, said coil being rotatably mounted about an axis through said central region, portions of said magnetic flux passing directly between said arcuate member and the shank of said hook-shaped core across the air gap while other portions of the flux after crossing the air gap pass between the arcuate member and shank through the intermediary of said tip of the core thereby providing unequal length flux paths and resultant unequal flux distribution along said air gap, a movably mounted magnetic shunt member extending between and overlying said arcuate magnetic member and shank in the region remote from said opening, said shunt member being positioned to shunt a portion of said flux from said air gap in said shank region, and a stop member fixed relative to said magnetic shunt to facilitate the adjustment thereof without movement into the region of said air gap to prevent interference with the rotation of said coil by said shunt.

References Cited in the file of this patent

UNITED STATES PATENTS

| 2,513,900 | Thomander | July 4, 1950 |
| 2,537,221 | Hickok | Jan. 9, 1951 |

FOREIGN PATENTS

| 486,695 | Great Britain | June 9, 1938 |